United States Patent
Wang et al.

(10) Patent No.: US 8,325,641 B2
(45) Date of Patent: Dec. 4, 2012

(54) METHOD AND APPARATUS FOR SERVICE IDENTIFYING AND ROUTING IN MULTIMEDIA BROADCAST/MULTICAST SERVICE SYSTEM

(75) Inventors: Yanhong Wang, Guangdong (CN); Hai Zhang, Guangdong (CN); Hao Hu, Guangdong (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 1606 days.

(21) Appl. No.: 11/631,437

(22) PCT Filed: Sep. 30, 2005

(86) PCT No.: PCT/CN2005/001637
§ 371 (c)(1),
(2), (4) Date: May 8, 2007

(87) PCT Pub. No.: WO2006/034660
PCT Pub. Date: Apr. 6, 2006

(65) Prior Publication Data
US 2008/0084871 A1    Apr. 10, 2008

(30) Foreign Application Priority Data

Sep. 30, 2004 (CN) .......................... 2004 1 0079092
Nov. 5, 2004 (CN) .......................... 2004 1 0092006

(51) Int. Cl.
*H04H 20/71* (2008.01)
(52) U.S. Cl. .................................. 370/312; 370/465
(58) Field of Classification Search .......................... None
See application file for complete search history.

(56) References Cited

U.S. PATENT DOCUMENTS

| | | | |
|---|---|---|---|
| 6,434,133 B1 * | 8/2002 | Hamalainen | 370/338 |
| 7,180,885 B2 * | 2/2007 | Terry | 370/338 |
| 2001/0033563 A1 * | 10/2001 | Niemela et al. | 370/349 |
| 2003/0153296 A1 * | 8/2003 | Mueller | 455/403 |
| 2004/0087319 A1 * | 5/2004 | Bos et al. | 455/458 |

(Continued)

FOREIGN PATENT DOCUMENTS

CN    1482777    3/2004

(Continued)

OTHER PUBLICATIONS

Written Opinion of the International Search Authority, mailing date Jan. 5, 2006, PCT/CN2005/001637.

(Continued)

*Primary Examiner* — Donald Mills
(74) *Attorney, Agent, or Firm* — Slater & Matsil, L.L.P.

(57) ABSTRACT

Embodiments of the present invention disclose a method and apparatus for service identifying and routing in a multimedia broadcast and multicast service (MBMS) system. The apparatus includes a radio access network equipment (RNC) and a core network equipment (CN) communicating with each other via an Iu connection; CN includes a module for service information transmission which is used to send the identity information corresponding to the service the UE joins to RNC, and RNC includes a module for service identifying and routing which is used to identify the service according to the identity information and determine the routing of the MBMS service in the non access stratum. RNC obtains the identity information corresponding to the service the UE joins through interaction of interface information with CN, identifies the service and determines the routing of the MBMS service in the non access stratum.

27 Claims, 6 Drawing Sheets

U.S. PATENT DOCUMENTS

| | | | |
|---|---|---|---|
| 2004/0127243 A1* | 7/2004 | Sarkkinen | 455/511 |
| 2004/0190525 A1* | 9/2004 | Leppisaari et al. | 370/395.5 |
| 2005/0026607 A1* | 2/2005 | Hwang et al. | 455/428 |
| 2005/0054353 A1* | 3/2005 | Mademann | 455/458 |
| 2007/0206595 A1* | 9/2007 | Herrero-Veron et al. | 370/390 |
| 2009/0034500 A1* | 2/2009 | Wang | 370/338 |
| 2011/0158174 A1* | 6/2011 | Hurtta et al. | 370/328 |

FOREIGN PATENT DOCUMENTS

| | | |
|---|---|---|
| CN | 1496137 A | 5/2004 |
| CN | 1499853 A | 5/2004 |
| CN | 1523798 A | 8/2004 |
| CN | 1585508 | 2/2005 |
| CN | 1665318 | 9/2005 |
| EP | 1 376 926 A1 | 1/2004 |
| EP | 1 377 099 A1 | 1/2004 |
| EP | 1 435 751 A1 | 7/2004 |
| EP | 1 447 945 A2 | 8/2004 |
| EP | 1 439 668 A2 | 7/2005 |
| WO | 2004/043024 A1 | 5/2004 |
| WO | 2004/073272 A1 | 8/2004 |

OTHER PUBLICATIONS

3GPP TS 25.346 v2.6.6 (Feb. 2004) $3^{rd}$ Generation Partners Technical Specification Group Radio Access Network; Introduction of the Multimedia Broadcast Multicast Service (MBMS) in the Radio Access Network (Stage-2); (Release 6) http://www.3gpp.org (56 pages).

Nortel Networks/ Samsung; "MBMS Scenarios- UE Link Handling", 3GPP TSG-RAN2/RAN3, Apr. 3, 2003, pp. 1-7, XP002292826, the whole document.

* cited by examiner

METHOD AND APPARATUS FOR SERVICE IDENTIFYING AND ROUTING IN MULTIMEDIA BROADCAST/MULTICAST SERVICE SYSTEM

FIELD OF THE INVENTION

The present invention relates to the techniques in Multimedia Broadcast/Multicast Service (MBMS), and particularly, to a method for service identifying and routing in an MBMS system.

BACKGROUND OF THE INVENTION

In a communication system, multicast and broadcast are techniques for transferring data from one source to multiple destinations. For instance, in the Ethernet, the Internet Group Management Protocol (IGMP) is a technique in Internet Protocol (IP) used for multicast.

Along with the development of mobile communications, multicast and broadcast find increasing applications in mobile networks. For instance, in a conventional mobile network, the Cell Broadcast Service (CBS) allows low bit-rate data to be transferred to all users via a shared broadcasting channel of a cell. This service is categorized as a service of message.

At present, development of mobile communications has made users' demand for mobile communications go beyond phone communications and message services. Along with the rapid development of the Internet, there is emerging a great deal of multimedia services, some applications of which require that multiple users be able to receive the same data at the same time, e.g. video on demand, telecast, video conference, network-based education, and interactive video games. Compared with conventional data, these mobile and multimedia services feature large data flow, long time duration, and high sensitivity to time delay. The existing techniques of IP multicast make it possible to implement these mobile and multimedia services in the form of multicast or broadcast on cabled IP networks. However, as mobile networks have special network architectures, entities of function and wireless interfaces, which are all different from those of a cabled IP network, existing IP multicast techniques are not applicable to mobile networks.

In order to solve the problems mentioned above and make an efficient use of resources of mobile networks, the WCDMA/GSM global standardization organization, 3GPP, has put forward the solution to Multimedia Broadcast/Multicast Service (MBMS), designed to provide services of transferring data from one source to multiple users in mobile networks so as to share network resources and improve the utility rate thereof, especially the utility rate of resources of wireless interface. MBMS defined by 3GPP can implement not only low-rate text multicast and broadcast of messages, but also multicast and broadcast of high-rate multimedia traffic, which is no doubt the trend of future development of mobile data transmission.

The system architecture of MBMS defined by 3GPP is as shown in FIG. 1, where the Broadcast Multicast-Service Center (BM-SC) is a newly-added mobile network functional entity to support MBMS traffic, which is the entrance of content providers (i.e. sources of multicast/broadcast) used in authorization and in initiating an MBMS bearer as well as transferring MBMS contents according to pre-defined schedules. In addition, functional entities, such as user equipment (UE), UMTS Terrestrial Radio Access Network (UTRAN), GSM EDGE Radio Access Network (GERAN), Serving GPRS Support Node (SGSN), and GPRS Gateway Support Node (GGSN), are enhanced to incorporate relevant functions of MBMS.

MBMS is implemented in two modes, the multicast mode and the broadcast mode. As there are differences between the multicast mode and the broadcast mode in service demand, the service procedures thereof are different.

The flowchart of MBMS multicast mode is as shown in FIG. 2, including such procedures as Subscription, Service announcement, Subscriber Joining, Session Start, MBMS notification, Data transfer, Session Stop, and Subscriber Leaving.

In the MBMS multicast mode, a user joins in the MBMS multicast service by an MBMS activation procedure such that the network could know which users desire to receive a certain specific MBMS service. The network nodes create, through an MBMS registration procedure, a distributing tree from BM-SC to Base Station Controller (BSC)/Radio Network Controller (RNC) via GGSN and SGSN so as to allow the transfer of the session attributes and data of MBMS. The registration procedure creates the MBMS context bearer at relevant nodes. When BM-SC is ready for transferring data, an MBMS Session Start procedure will be triggered. The Session Start procedure activates all the bearer resources on the network needed for transferring MBMS data, and notifies the interested UE that the data transfer is about to start. By this procedure, BM-SC provides the relevant network nodes with the session attributes, such as Quality of Service (QoS), MBMS service domain, and parameter of estimated session duration. This procedure will also trigger such jobs as session notification on the access network by RNC, counting of cell users, selection of radio bearer type, set-up of wireless and cabled bearer plains. BM-SC will start transferring multicast data after the down-stream nodes complete the appropriate jobs. Each node transfers the multicast data through the bearer created in the Session Start procedure, until UE.

The flowchart of MBMS broadcast mode is as shown in FIG. 3, including such procedures as Service announcement, Session Start, MBMS notification, Data transfer, and Session Stop.

In the MBMS broadcast mode, as information of a broadcast service is sent to all users in the radio network, the MBMS registration procedure is not needed at each network node. When BM-SC is ready for transferring data, an MBMS Session Start procedure will be triggered. The Session Start procedure activates all the bearer resources in the network needed for transferring MBMS data. By this procedure, BM-SC provides the relevant interested network nodes with the session attributes, such as the Terminal Mobile Group Identity (TMGI) of the MBMS bearer traffic, Quality of Service (QoS), MBMS service domain, and parameter of estimated session duration (if there exists). This procedure will also trigger such jobs as set-up of wireless and cabled bearer plains. BM-SC will start transferring broadcast data after the down-stream nodes complete the appropriate jobs. Each node transfers the broadcast data through the bearer created in the Session Start procedure, until UE.

It can be seen by persons skilled in the art that the main service procedures of MBMS broadcast mode and multicast mode are similar, both including the processing in the successive procedures of Service announcement, Session Start, MBMS notification, Data transfer, and Session Stop. The difference of the two modes lies in that the multicast mode also includes UE subscribing to the appropriate multicast group, activating the service, and generating appropriate charging information based on the time when the UE joins and leaves.

There are two modes in which MBMS service is provided at wireless interfaces: one is the Point to Point (PTP) mode, the other is the Point to Multipoint (PTM) mode. As power control can be made in the PTP mode, this mode is preferably used when there are fewer users. If the number of users increases, however, the PTP mode will consume a lot of radio resources and inevitably lead to a higher transmitting power of the base station. If the PTM mode is used when there are more users, on the other hand, not only the resources of wireless interface will be saved, but also the transmitting power of the base station will be saved. In order to enable RNC to determine a bearer mode according to the number of users in each cell who demand a certain MBMS service, the MBMS system introduces the counting and recounting procedures.

The counting procedure refers to the procedure by which RNC counts the number of users within a cell receiving an MBMS service when the session of this MBMS service starts while the recounting procedure is to recount the number of users during the session so as to determine that the PTM mode adopted is still the currently suitable bearer mode. In the counting procedure, it is mainly the users in the idle state that are counted. After receiving the counting instruction, users in the idle state need to set up a radio resource control (RRC) connection, then UTRAN will initiate a procedure of setting up Packet Mobility Management (PMM) connection. Thereafter, CN will obtain the list of services this user joins through a UE Linking procedure. This is in fact the procedure of a Packet Switching (PS) connection set up between the user and CN, and RNC obtains from the PS domain of CN the services this user joins via the interface Iu-PS. In this description, Iu refers to the standard interface between RNC and CN.

If a user has not set up a PS connection with the network, in another word, there is no Iu-PS interface between the network and the user, then the relevant information of the services the user joins may be obtained as well by UTRAN when needed via the established Iu-CS interface. In this description, CS is the short form for circuit switching.

When adopting the PTP bearer mode, RNC needs to identify a service using the Network Service Access Point Identifier (NSAPI) corresponding to the service the user joins. At the user side, NSAPI is used in indicating the Packet Data Protocol (PDP)-Service Access Point (SAP), i.e. PDP-SAP, while in SGSN and GGSN, NSAPI is used in indicating the PDP context associated with the PDP address. When requesting for activation of a PDP context, UE needs to select a NSAPI not used by itself.

FIG. 4 is a schematic diagram illustrating the use of NSAPI. As shown in FIG. 4, UE receives IP packets from the SAP with an IP address A (i.e. the IP address, A SAP), makes Protocol Data Units (PDU) into packets, and initializes the NSAPI of this SAP as NSAPI-1. After receiving the IP PDU, SGSN analyzes NSAPI-1, and decides to send the data of IP PDU to the GGSN associated with the IP address A. NSAPI has a corresponding relationship with the International Mobile Subscriber Identity (IMSI). It can be seen from the above example that the role of NSAPI is primarily for identifying the route on the network layer through the IMSI of the user.

This invention relates to the procedure of "Session Start" in an MBMS service. When UTRAN needs to obtain from the network the services a user joins, it also needs to obtain from the network the NSAPI of the user in connection with each service used in identifying the routing of the service the user joins, i.e. used in indicating the service information.

Obviously, for a user, the service identity may as well include the information of Radio Access Bearer Identity (RAB ID) or information of Transaction Identity (TI).

In the prior art, there are two ways in which UTRAN obtains from CN the list of services a user joins, one is the way without PS connection, the other is the way with PS connection.

FIG. 5 is the flowchart for UTRAN obtaining from CN the list of services a user joins when there is no PS connection. When there is no PS connection, a user has only the Iu-CS interface but no Iu-PS interface, i.e. this user is in the connection with RRC and at the PMM-IDLE state. In this case, the process in which UTRAN obtains from CN the list of services the user joins includes primarily the steps of:

Step 501: UE sets up a CS connection with the MSC of CN, i.e. sets up an Iu connection in the CS domain, realizing the signaling connection from UE to MSC; at this time, the Iu of UE in the PS domain is in the PMM-IDLE state, i.e. there is no signaling connection at the Iu-PS interface.

Step 502: RNC requests, in the non-connection mode, SGSN for the list of services this user joins, and the requesting message sent is MBMS SERVICE ID REQ, where the IMSI of the UE is contained.

Step 503: SGSN responds with the message MBMS SERVICE ID RESPONSE, where all the lists of services the user joins are included.

FIG. 6 is the flowchart for UTRAN obtaining from CN the list of services a user joins with a PS connection. When there is a PS connection, i.e. there is a signaling connection at the Iu-PS interface, RAN will send message using the existing procedure of UE Linking, then the process in which UTRAN obtains from CN the list of services the user joins includes primarily the steps of:

Step 601: RNC initiates to CN a procedure of setting up PMM connection.

Step 602: CN informs RNC of the list of services the user joins through a special Iu procedure, i.e. through the signaling of MBMS UE LINKING REQUEST.

Step 603: RNC returns to CN the signaling of MBMS UE LINKING RESPONSE, informing CN that the list of services the user joined has been obtained.

SUMMARY OF THE INVENTION

In view of the above, an embodiment of the invention provides a method for service identifying and routing in an MBMS system such that, when a radio access network adopts the PTP bearer mode for an MBMS service, RNC and UE are able to identify the service type and set up a route for the service and the MBMS service could be implemented in the PTP bearer mode.

An embodiment of the invention also provides an apparatus for service identifying and routing in an MBMS system such that, when a radio access network adopts the PTP bearer mode for an MBMS service, RNC and UE are able to identify the service type and set up a route for the service and the MBMS service could be implemented in the PTP bearer mode. According to one embodiment of this invention, a method for service identifying and routing in a multimedia broadcast and multicast service system, includes the steps of:

a radio access network (RAN) device obtaining identity information corresponding to a service that a user equipment (UE) joins, through interaction of interface information with a core network (CN);

the RAN device identifying the service according to the identity information, and determining a route of the MBMS service in the non access stratum.

According to another embodiment of the present invention, an apparatus for service identifying and routing in a multimedia broadcast and multicast service (MBMS) system, including: a radio access network (RAN) device and a core network (CN) device communicating with each other via Iu connection, wherein the CN device further includes a module for service information transmission that is used to send the identity information corresponding to the service a UE joins to the RAN device; and the RAN device further includes a module for service identifying and routing that is used to identify a service according to the identity information and determine a route of MBMS in a non access stratum.

It can be found by comparison that the distinction between the solution in accordance with embodiments of this invention and one of the prior art lies in that, in accordance with embodiments of this invention, RNC in the RAN obtains from CN through an Iu procedure not only the list of services a UE joins, but also the identity information corresponding to the service (this identity information may include NSAPI, TI, or RAB ID). RNC and UE may match the service with the related context in the Non Access Stratum (NAS) according to the obtained identity information, and determine the routing of the MBMS service. The step of obtaining the identity information may be performed before RNC determines the radio bearer mode of the service or after RNC has obtained the list of services the UE joins and has determined the radio bearer mode of the service such that only the identity information corresponding to the services using the PTP bearer mode is obtained.

This distinction in technical solution brings about obvious benefits, i.e. since RNC has obtained the identity information corresponding to a service from CN, RNC and UE can identify the service by the identity information when deciding to use the PTP transmission bearer mode for a certain service, and thereby sets up the routing of the MBMS service. In this way, an MBMS service can be successfully implemented in the PTP bearer mode.

In accordance with embodiments of this invention, it is also possible to obtain the identity information corresponding to the services that use the PTP bearer mode after the radio bearer modes of the services have been determined such that RNC and UE can identify the service type. Since the information to be transferred in this way is reduced, the transferring load of Iu interface can be further lowered and the efficiency of the procedure of obtaining identity information improved.

DETAILED DESCRIPTION OF PREFERRED EMBODIMENT

Figure 1:
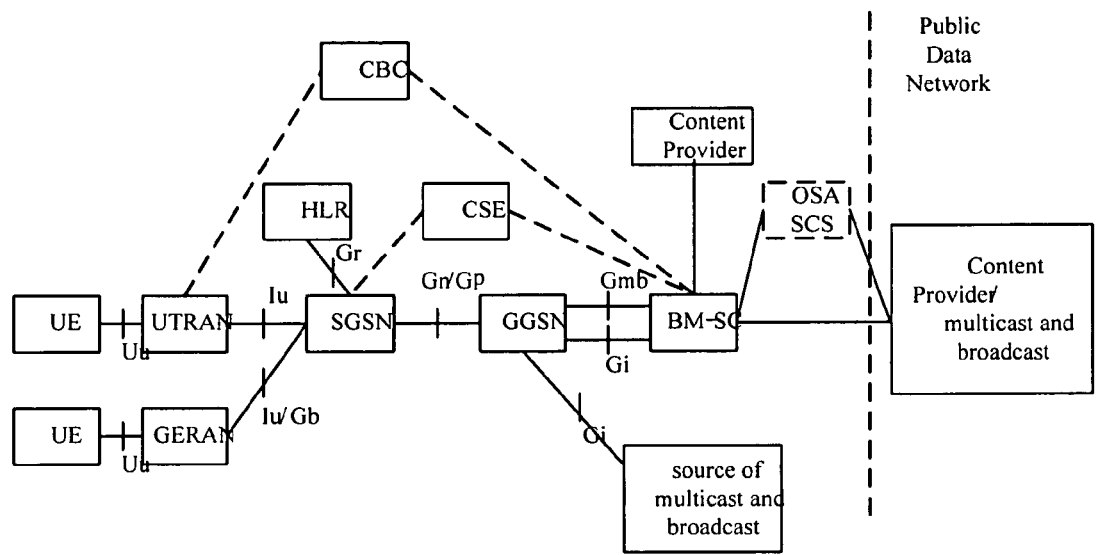
FIG. 1 shows the system architecture of MBMS defined by 3GPP.
Figure 2:
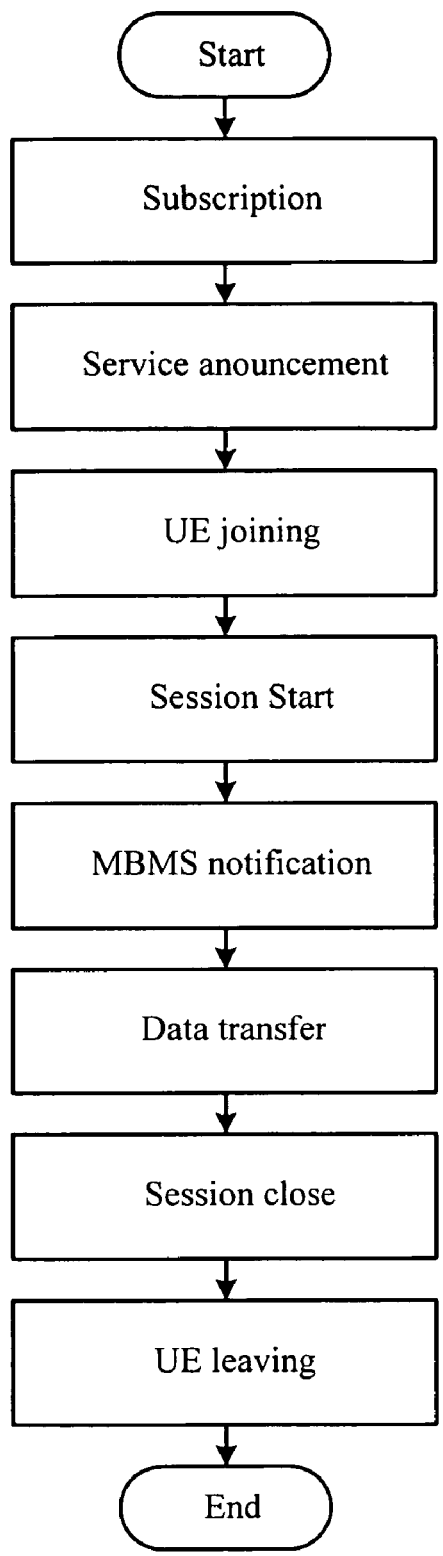
FIG. 2 is the flowchart of the MBMS multicast mode.
Figure 3:
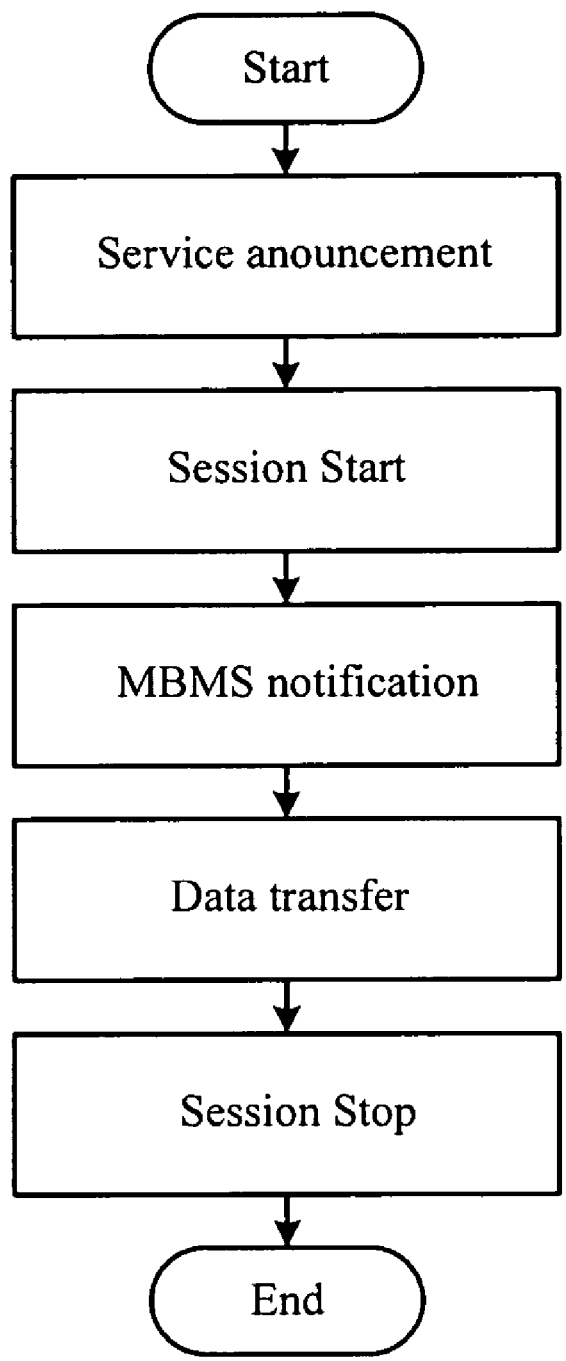
FIG. 3 is the flowchart of the MBMS broadcast mode.
Figure 4:
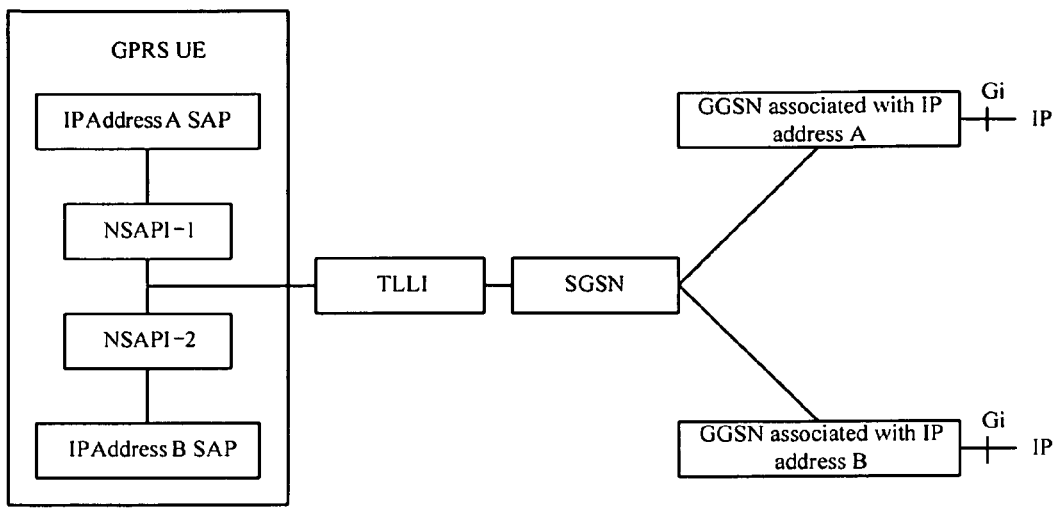
FIG. 4 is a schematic diagram illustrating the use of NSAPI.
Figure 5:
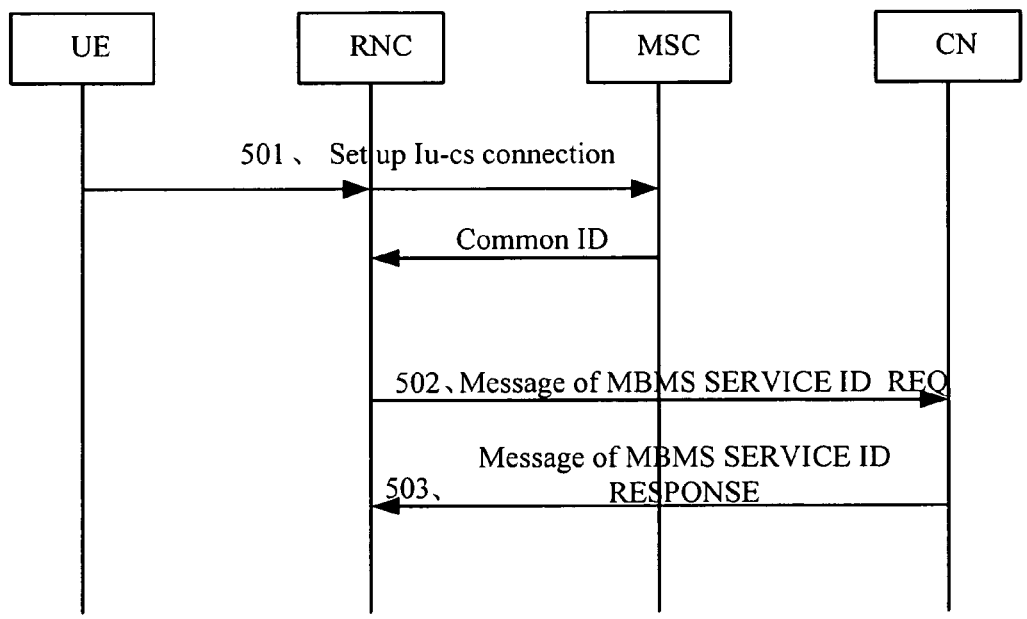
FIG. 5 is the flowchart of UTRAN obtaining from CN the list of services a UE joins without PS connection.
Figure 6:
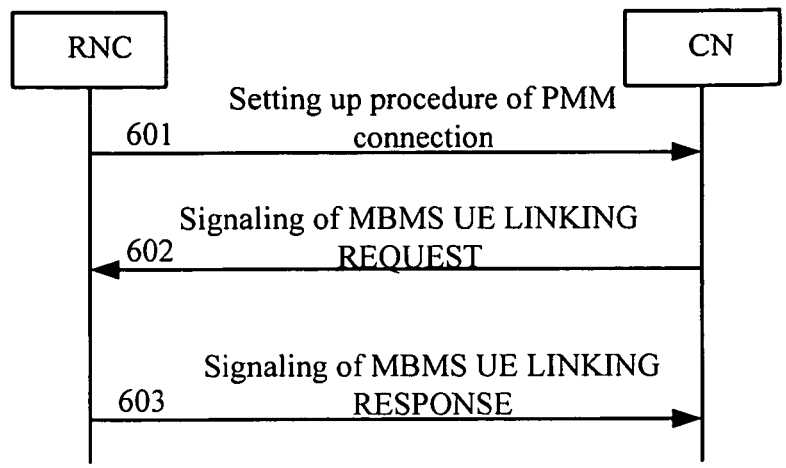
FIG. 6 is the flowchart of UTRAN obtaining from CN the list of services a UE joins with PS connection.

Solutions in the prior art bring about the followinq problem: when RNC uses the PTP mode to bear an MBMS service, RNC and UE can not identify the service, and can not set up a route for the service.

The main reason that causes this problem is that, in the prior art, there is no procedure of informing UE of the NSAPI, i.e. RNC can not know the NSAPI. The network side does not provide UE with the NSAPI of the MBMS service received by the UE. Thus, when RNC decides to set up a PTP bearer mode for transferring a service, UE and RNC can not know which service this bearer is set up for, then there is the situation when RNC and UE can not identify the service and can not set up a route for the service. In an MBMS system, TI or RAB ID is equivalent to NSAPI, therefore if NSAPI or TI is known, it means that RAB ID is known and UE will be able to identify the service. In the prior art described above, however, RNC and UE can not obtain TI or RAB ID, either, therefore, RNC and UE still can not identify the service and can not set up a route for the service.

If it is the PTM mode that is adopted, as TMGI is used to identify the type of the service, the information of NSAPI or TI is not needed.

In order to make clearer the objectives, solution, and merits of this invention, a detailed description is hereinafter given to the embodiments with reference to the accompanying drawings.

The core of the solution in accordance with the embodiment is as follows: CN, via an Iu procedure, not only informs the RNC of the list of services UE joins, but also sends the identity information corresponding to service (NSAPI, TI or RAB ID). RNC and UE lookup the related PDP context in NAS according to the identity information and implement the routing. The step of obtaining identity information may be performed before RNC determines the bearer mode, or after RNC has determined the bearer mode such that only the identity information corresponding to the services adopting the PTP bearer mode needs to be obtained.

The identity information in this embodiment may include NSAPI or TI or RAB ID, and the NSAPI mentioned in this invention may be replaced by TI or RAB ID. This invention is applicable to such systems as GSM, WCDMA, CDMA 2000, etc. and herein is described by taking WCDMA system as an example. It can be easily seen by persons skilled in the art that UTRAN mentioned in this invention may correspond to RAN in other radio communication systems and RNC in this invention may correspond to BSC in other radio communication systems.

Since routing in NAS through NSAPI is in accordance with the prior art, description of this invention is focused on the method for obtaining NSAPI.

There are two circumstances in which NSAPI is obtained: one is that there is no Iu connection in the PS domain, then it is needed to inform UE of the NSAPI through an approach without connection; the other is that there is MBMS connection, then it is needed to inform UE of the NSAPI through a UE linking procedure.

Next, the solution in accordance with this invention is described with reference to specific embodiments.

Figure 7:
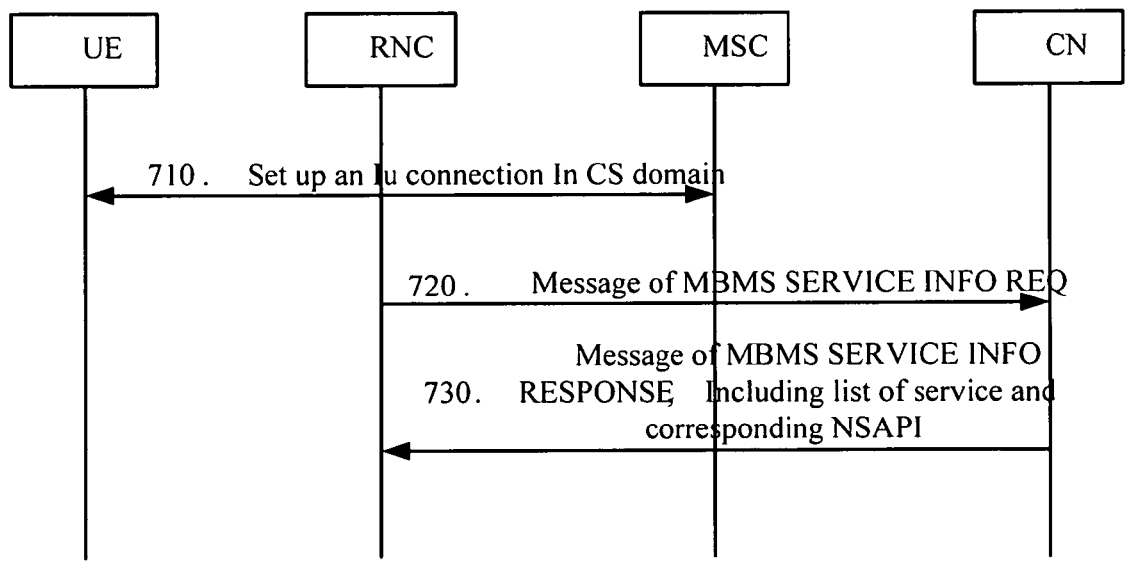
FIG. 7 is the flowchart of the first embodiment in accordance with an embodiment of this invention in which CN informs RNC and UE of the NSAPI without an Iu connection of PS domain.

FIG. 7 is the flowchart of the first embodiment in accordance with this invention. As shown in FIG. 7, a method for informing RNC and UE of the NSAPI when there is no Iu connection in the PS domain is presented, including the steps of:

Step 710: UE sets up a CS connection with an MSC of the core network, i.e. sets up an Iu connection in the CS domain so as to implement signaling connection between the UE and the MSC. At this time, Iu of the UE in the PS domain is in the PMM-IDLE state, i.e. there is no signaling connection in the Iu-PS interface at this time.

Step 720: RNC sends, in the non-connection mode (i.e. in the mode without connection in the PS domain), to SGSN in the CN the request for the list of services this UE joins and the NSAPI corresponding to the service. This request message includes MBMS SERVICE INFO REQ, which contains at least the identity of this UE. This identity herein is the IMSI of the UE.

Step 730: After receiving the message of MBMS SERVICE INFO REQ, SGSN searches in its own service database according to the IMSI in the received message, obtains all the lists of service the UE corresponding to the IMSI joins and the NSAPI corresponding to the services, and returns to RNC the message of MBMS SERVICE INFO RESPONSE, which includes all the found lists of service the UE corresponding to the IMSI joins and the NSAPI corresponding to the services as well as the IMSI of the UE.

RNC obtains the NSAPI by reading the message of MBMS SERVICE INFO RESPONSE, identifies the service according to the NSAPI, and matches the service with an appropriate PDP context in the NAS using the NSAPI, thus implementing the routing. RNC can inform the UE of the obtained NSAPI through the interface Uu, UE then can also identify the service according to the NSAPI, match the service with the appropriate PDP context in the NAS using the NSAPI, and thereby implement the routing.

In accordance with this embodiment, RNC may use other identifications of UE other than IMSI when obtaining service information, e.g. using TMSI (Temperate Mobile Subscription Identity) or URNTI instead of the above IMSI.

The second embodiment of this invention has the same procedure as the above first embodiment while the distinction between the two is as follows: The request message sent by RNC to SGSN in step 720 is used in requesting the list of services the UE joins and the RAB ID corresponding to the services; and in step 730, SGSN searches in its own service database according to the UE identity, obtains all the lists of service the UE corresponding to this UE identity joins and the RAB ID corresponding to the services, and returns to RNC all the found lists of service the UE joins and the RAB ID information corresponding to the services; RNC then informs the UE in turn. Likewise, RNC and UE may match the service with an appropriate PDP context in the NAS according to the RAB ID, and thereby implement the routing.

The third embodiment of this invention has the same procedure as the above first embodiment while the distinction between the two is as follows: The request message sent by RNC to SGSN in step 720 is used in requesting the list of services the UE joins and the TI information corresponding to the service; and in step 730, SGSN searches in its own service database according to the UE identity, obtains all the lists of service the UE corresponding to this UE identity joins and the TI information corresponding to the services, and returns to RNC all the found lists of service the UE joins and the TI information corresponding to the services; RNC then informs the UE in turn. Likewise, RNC and UE may match the service with an appropriate PDP context in the NAS according to the TI information, and thereby implement the routing.

Figure 8:
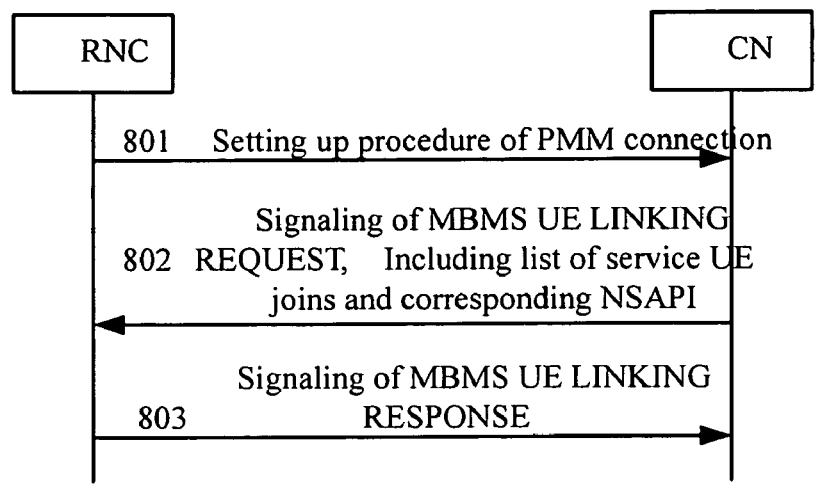
FIG. 8 is the flowchart of the fourth embodiment in accordance with an embodiment of this invention in which CN informs RNC and UE of the NSAPI with an Iu connection of PS domain.

FIG. 8 is the flowchart of the fourth embodiment in accordance with this invention. As shown in FIG. 8, in the fourth embodiment of this invention, RNC and UE are informed of NSAPI when there is a PS connection (i.e. there is an MBMS connection). Since there is an Iu-PS connection for signaling connection in this embodiment, RAN sends the NSAPI of UE using a UE Linking procedure, which includes the steps of:

Step 801: UE initiates a procedure of setting up PMM connection to CN via RNC. By the procedure of setting up PMM connection, CN can obtain the identity information of the UE, e.g. the IMSI, TMSI, or URNTI of the UE.

Step 802: CN (specifically, SGSN in CN) searches the database according to the identity information of the UE, determines the information of all the lists of service this UE joins and the identity information corresponding to the services, i.e. NSAPI, and then notifies RNC of the lists of service the UE joins and the corresponding NSAPI through a special Iu procedure, i.e. through the signaling of MBMS UE LINKING REQUEST.

Step 803: After receiving the signaling of MBMS UE LINKING REQUEST, RNC returns to CN a signaling of MBMS UE LINKING RESPONSE, informing CN that the list of services the UE joins and the corresponding NSAPI have been obtained, and informs the UE of the NSAPI.

RNC obtains the NSAPI by reading the signaling of MBMS UE LINKING RESQUEST, identifies the service according to the NSAPI, and matches the service with an appropriate PDP context in the NAS using the NSAPI, thus implementing the routing. RNC can inform the UE of the obtained NSAPI through the interface Uu, UE then can also identify the service according to the NSAPI, match the service with the appropriate PDP context in the NAS using the NSAPI, and thereby implement the routing.

The fifth embodiment of this invention has some changes from the fourth embodiment, i.e. in step 802, the identity information includes the RAB ID corresponding to the service; and likewise, RNC and UE can identify a service according to RAB ID, match the service with an appropriate PDP context in the NAS, and thereby implement the routing.

Similar to the fifth embodiment, the sixth embodiment of this invention has some changes from the fourth embodiment, i.e. in step 802, the identity information includes the TI information corresponding to the service; and likewise, RNC and UE can identify a service according to TI information, match the service with an appropriate PDP context in the NAS, and thereby implement the routing.

In the above six embodiments, the list of services UE joins and the identity information corresponding to the service are obtained at the same time. In the seventh embodiment, the process of obtaining the list of services UE joins and the process of obtaining the identity information corresponding to the service are carried out separately, and the specific obtaining processes are the same as the above six embodiments except for the contents obtained.

As the process of obtaining the identity information corresponding to the service in the above six embodiments are carried out at the same time as the process of obtaining the list of services UE joins and the procedure of obtaining the list of services UE joins is categorized as a counting procedure, it means that the list of service and the corresponding identity information are obtained before RNC decides the bearer mode to be used.

The eighth embodiment of this invention has changed from the first six embodiments: the identity information may also be obtained after RNC has decided the bearer mode to be used. Then for the services adopting the PTP bearer mode, the identity information, NSAPI or TI or RAB ID, corresponding to service is obtained through a special Iu procedure, which is as follows: To obtain the list of services UE joins through the MBMS SERVICE ID REQUEST (without PS connection) procedure in the prior art, and after RNC has decided the bearer mode of the cell, obtain the NSAPI or TI or RAB ID of various lists of service through a special Iu procedure for the services adopting the PTP bearer mode. This special Iu procedure is similar to the first, second, and third embodiments except for the distinction that the MBMS SERVICE INFO REQ is used in requesting the identity information corresponding to the service the UE joins and the MBMS SERVICE INFO RESPONSE is used in returning to RNC the identity information corresponding to the service the UE joins.

Obtain the list of services UE joins through the UE LINKING (with PS connection) procedure in the prior art, and after RNC has decided the bearer mode of the cell, obtain the identity information, NSAPI or TI or RAB ID, corresponding to the service through a special Iu procedure for the services adopting the PTP bearer mode. This special Iu procedure is similar to the fourth, fifth, and sixth embodiments except for the difference that the MBMS UE LINKING REQUEST is used in returning the identity information corresponding to the service the UE joins.

Figure 9:
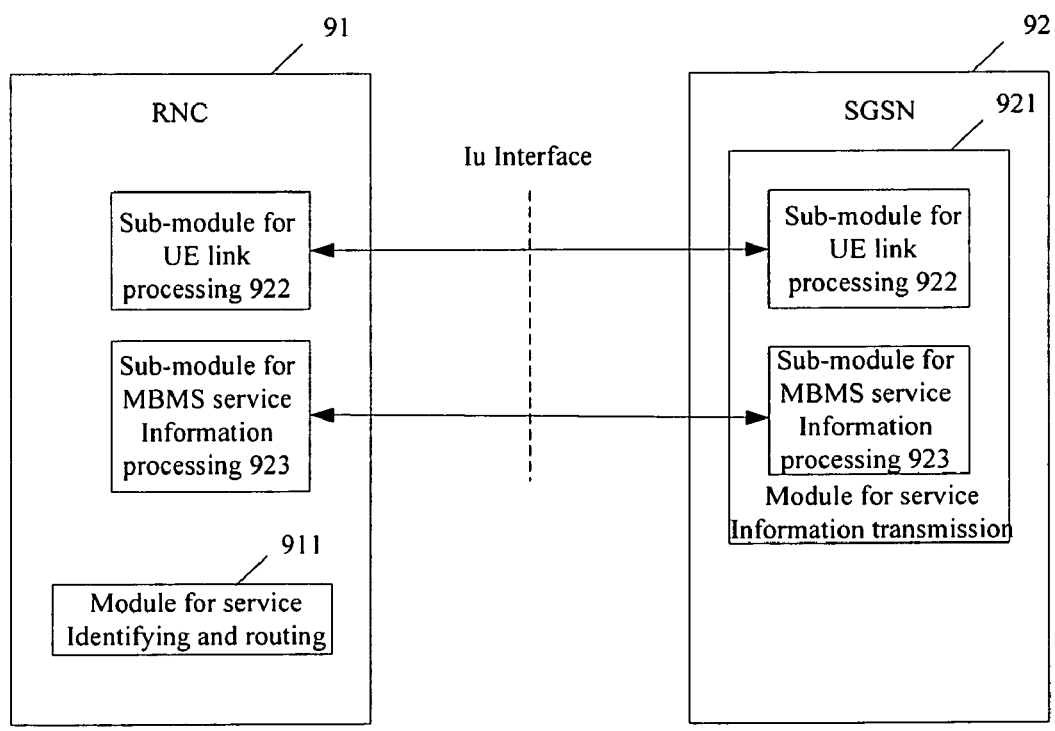
FIG. 9 is a schematic diagram illustrating the structure of the apparatus for service identifying and routing in an MBMS system in accordance with an embodiment of this invention.

Based on the foregoing method, this invention presents an apparatus for service identifying and routing in an MBMS system as well, the structure of which is shown in FIG. 9. As shown in FIG. 9, the apparatus includes: an RAN device (e.g. RNC) 91 and a CN device (e.g. SGSN) 92 communicate with each other through Iu interface. The distinction from the prior art lies in that the CN device further includes a module for service information transmission 921 which is used in sending to the RAN device the identity information (e.g. NSAPI, RAB ID, or TI) corresponding to the service UE joins and the RAN device further includes a module for service identifying and routing 911 which is used in identifying a service according to the identity information and determining the routing of the MBMS service in the non access stratum.

The apparatus further includes a sub-module for UE link processing 922; when there is an Iu connection of PS domain in the Iu interface between the RAN device and the CN device, the module for service information transmission sends the identity information to the CN device using the sub-module for UE link processing 922.

The apparatus further includes a sub-module for MBMS service information processing 923; when there are only Iu connections of CS domain in the Iu interface between the RAN device and the CN device, the module for service information transmission sends the identity information to the CN device using the sub-module for MBMS service information processing 922.

In addition, the module for service information transmission 921 is further used in sending to the RAN device the information of list of service UE joins; and is also further used in sending to the RAN device the identity information of UE (e.g. IMSI, TMSI, or URNTI).

The foregoing description is only preferred embodiments of this invention and should not be construed as limiting the protection scope thereof. Any changes or substitutions within the technical scope disclosed by this invention which are easily known to people skilled in the art should be covered by the protection scope of this invention.

The invention claimed is:

1. A method for service identifying and routing in a multimedia broadcast and multicast service (MBMS) system, the method comprising:

a radio access network (RAN) device obtaining identity information corresponding to a service that a user equipment (UE) joins, through interaction of interface information with a core network (CN);

the RAN device identifying the service according to the identity information, and determining a route of the MBMS service in the non access stratum when using a Point to Point (PTP) bearer mode; wherein if there is an Iu connection of a Packet Switching (PS) domain on the UE, the RAN device obtains the identity information corresponding to the service the UE joins through a UE Linking procedure; and if there is an Iu connection of a Circuit Switching (CS) domain on the UE, the RAN device obtains the identity information corresponding to the service the UE joins through a MBMS service information requesting procedure.

2. The method according to claim 1, wherein the identity information corresponding to the service comprises the network service access point identifier (NSAPI).

3. The method according to claim 1, wherein the identity information corresponding to the service comprises the radio access bearer identity (RAB ID).

4. The method according to claim 1, wherein the identity information corresponding to the service comprises the transaction identity (TI).

5. The method according to claim 1, further comprising: the RAN device obtaining a list of services the UE joins through the interaction of interface information with the core network.

6. The method according to claim 5, wherein, the procedure of the RAN device obtaining the list of services the UE joins and the procedure of the RAN device obtaining the identity information corresponding to the service are carried out separately.

7. The method according to claim 5, wherein, the procedure of the RAN device obtaining the list of services the UE joins and the procedure of the RAN device obtaining the identity information corresponding to the service are carried out simultaneously.

8. The method according to claim 1, wherein the step of the RAN device obtaining the identity information corresponding to the service from the CN is performed before the RAN device determines the radio bearer mode of the service.

9. The method according to claim 1, wherein the step of the RAN device obtaining the identity information corresponding to the service from the CN is implemented after the RAN device has obtained the list of services the UE joins from the CN and has determined the radio bearer mode of the service.

10. The method according to claim 9, wherein after the RAN device has obtained the list of services the UE joins from the CN and has determined the radio bearer mode of the service, the RAN device obtains the identity information corresponding to the services using the PTP bearer mode from the CN.

11. The method according to claim 1, further comprising: the RAN device informing the UE of the identity information corresponding to the service, the UE identifying the service according to the identity information and the RAN device determining the route of the MBMS service in the non access stratum when using the PTP bearer mode.

12. The method according to claim 1, wherein the RAN device is a radio network controller (RNC).

13. The method according to claim 1, wherein the RAN device obtains the identity information of the UE while obtaining the identity information corresponding to the service from the CN.

14. The method according to claim 13, wherein the identity information of UE comprises International Mobile Station Identity.

15. The method according to claim 13, wherein the identity information of UE comprises Temporary Mobile Subscriber Identity.

16. The method according to claim 13, wherein the identity information of UE comprises Radio Network Temporary Identity (URNTI).

17. An apparatus for service identifying and routing in a multimedia broadcast and multicast service (MBMS) system, the apparatus comprising:
   a radio access network (RAN) device; and
   a core network (CN) device, wherein the RAN device and the CN device communicate with each other via Iu connection,
   wherein the CN device comprises a module for service information transmission that is used to send the identity information corresponding to the service a UE joins to the RAN device; and
   wherein the RAN device comprises a module for service identifying and routing that is used to identify a service according to the identity information and determine a route of MBMS in a non access stratum when using a Point to Point (PTP) bearer mode;
   wherein the apparatus further comprises a sub-module for UE link processing and a sub-module for MBMS service information processing,
   wherein the module for service information transmission sends the identity information to the CN device using the sub-module for UE link processing if there is an Iu connection of a Packet Switching (PS) domain in the Iu connections between the RAN device and the CN device; and the module for service information transmission sends the identity information to the CN device using the sub-module for MBMS service information processing if there is an Iu connection of a Circuit Switching (CS) domain in the Iu connections between the RAN device and the CN device.

18. The apparatus according to claim 17, wherein the module for service information transmission is further used to send a list of services the UE joins to the RAN device.

19. The apparatus according to claim 17, wherein the RAN device is a radio network controller.

20. The apparatus according to claim 17, wherein the CN device is a Serving GPRS Support Node.

21. The apparatus according to claim 17, wherein the identity information corresponding to service comprises a network service access point identifier (NSAPI).

22. The apparatus according to claim 17, wherein the identity information corresponding to service comprises a radio access bearer identity (RAB ID).

23. The apparatus according to claim 17, wherein the identity information corresponding to service comprises a transaction identity (TI).

24. The apparatus according to claim 17, wherein the module for service information transmission is further used to send the identity information of UE to the RAN device.

25. The apparatus according to claim 24, wherein the identity information of UE comprises International Mobile Station Identity.

26. The apparatus according to claim 24, wherein the identity information of UE comprises Temporary Mobile Subscriber Identity.

27. The apparatus according to claim 24, wherein the identity information of UE comprises URNTI.

* * * * *